US010263457B2

(12) United States Patent
Nishimura et al.

(10) Patent No.: US 10,263,457 B2
(45) Date of Patent: Apr. 16, 2019

(54) UNINTERRUPTIBLE POWER SUPPLY DEVICE AND UNINTERRUPTIBLE POWER SUPPLY SYSTEM USING THE SAME (71) Applicant: TOSHIBA MITSUBISHI-ELECTRIC INDUSTRIAL SYSTEMS CORPORATION, Chuo-ku (JP)

(72) Inventors: Kazuki Nishimura, Chuo-ku (JP); Hiroshi Masunaga, Chuo-ku (JP); Masahiro Kinoshita, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 0 days.

(21) Appl. No.: 15/562,074

(22) PCT Filed: Apr. 1, 2015

(86) PCT No.: PCT/JP2015/060327
§ 371 (c)(1),
(2) Date: Sep. 27, 2017

(87) PCT Pub. No.: WO2016/157469
PCT Pub. Date: Oct. 6, 2016

(65) Prior Publication Data
US 2018/0076656 A1 Mar. 15, 2018

(51) Int. Cl.
H02J 9/06 (2006.01)
H02M 7/12 (2006.01)
(Continued)

(52) U.S. Cl.
CPC ............ H02J 9/06 (2013.01); H02J 3/38 (2013.01); H02M 7/12 (2013.01); H02M 7/493 (2013.01)

(58) Field of Classification Search
CPC .. H02J 9/04; H02J 2009/063; H02J 2009/068; H02J 3/38; H02M 7/00; H02M 7/12; H02M 7/48; H02M 5/40
See application file for complete search history.

(56) References Cited

U.S. PATENT DOCUMENTS

2008/0197706 A1* 8/2008 Nielsen ................ H02J 1/102
307/66
2010/0102762 A1* 4/2010 Sugimoto ........... H02M 5/4585
318/376
(Continued)

FOREIGN PATENT DOCUMENTS

JP    2010-187431 A    8/2010
JP    WO2010/100737 A    9/2010
(Continued)

OTHER PUBLICATIONS

Office Action dated Oct. 9, 2018 in Japanese Patent Application No. 2017-509085 w/English translation.
(Continued)

Primary Examiner — Rexford Barnie
Assistant Examiner — Thai Tran
(74) Attorney, Agent, or Firm — Oblon, McClelland, Maier & Neustadt, L.L.P.

(57) ABSTRACT

An uninterruptible power supply device (60) does not have a wire connecting a bidirectional chopper (24) to a neutral point (NP). The bidirectional chopper (24) includes first and second capacitors (C11, C12), first to fourth transistors (Q11-Q14), and a normal mode reactor (50). In a discharging mode, a controller (63) causes the second and third transistors (Q12, Q13) to be complementarily turned on and controls the ON period of each of the second and third
(Continued)

transistors (Q12, Q13) so that terminal-to-terminal voltages (V11, V12) of the first and second capacitors (C11, C12) are equal to each other.

4 Claims, 9 Drawing Sheets

(51) Int. Cl.
    *H02M 7/493*    (2007.01)
    *H02J 3/38*    (2006.01)

(56) References Cited

U.S. PATENT DOCUMENTS

2011/0134672 A1\*  6/2011  Sato .................. H02M 1/10
                                                                                               363/126
2011/0170322 A1    7/2011  Sato et al.

FOREIGN PATENT DOCUMENTS

| JP | 2011-142705 A | 7/2011 |
| JP | 2011-1427252 A | 7/2011 |
| WO | WO 2010-021052 A1 | 2/2010 |
| WO | 2010/044164 A1 | 4/2010 |

OTHER PUBLICATIONS

International Search Report dated Jun. 16, 2015 in PCT/JP2015/060327, filed on Apr. 1, 2015.

\* cited by examiner

UNINTERRUPTIBLE POWER SUPPLY DEVICE AND UNINTERRUPTIBLE POWER SUPPLY SYSTEM USING THE SAME

TECHNICAL FIELD

The present invention relates to an uninterruptible power supply device and an uninterruptible power supply system using the uninterruptible power supply device, and particularly to a three-phase four-wire uninterruptible power supply device and an uninterruptible power supply system using the three-phase four-wire uninterruptible power supply device.

BACKGROUND ART

Japanese Patent Laying-Open No. 2010-187431 (Patent Document 1) discloses a three-phase four-wire uninterruptible power supply system supplying a three-phase AC voltage and a neutral-point voltage to a load. The uninterruptible power supply system includes a plurality of uninterruptible power supply devices connected in parallel with one another to a load. Each uninterruptible power supply device includes a converter converting a three-phase AC voltage from an AC power supply into a DC voltage, a capacitor smoothing the DC voltage, an arm generating a neutral-point voltage based on the DC voltage, and an inverter converting the DC voltage into a three-phase AC voltage. A battery supplying a DC voltage to the arm and the inverter during an outage is connected to the capacitor.

Japanese Patent Laying-Open No. 2011-142705 (Patent Document 2) discloses an uninterruptible power supply system including a plurality of uninterruptible power supply devices connected in parallel with one another to a load. The plurality of uninterruptible power supply devices share a battery. Each uninterruptible power supply device includes a converter, an inverter, and a bidirectional chopper. The converter converts AC power from an AC power supply into DC power. The inverter converts the DC power into AC power to supply the AC power to the load. During a normal condition in which the AC power supply supplies AC power, the bidirectional chopper stores a part of the DC power generated by the converter in the battery. During an outage in which the AC power supply stops supply of AC power, the bidirectional chopper supplies the DC power in the battery to the load.

CITATION LIST

Patent Document

PTD 1: Japanese Patent Laying-Open No. 2010-187431
PTD 2: Japanese Patent Laying-Open No. 2011-142705

SUMMARY OF INVENTION

Technical Problem

In the three-phase four-wire uninterruptible power supply system, respective neutral points of the plurality of uninterruptible power supply devices are connected to one another. In the case where the bidirectional chopper of each uninterruptible power supply device is connected to the neutral point (see FIG. 2) and the bidirectional shopper fails to cause the battery to be short-circuited to the neutral point, current may flow from the battery to the load and the other uninterruptible power supply devices through the neutral point to cause the load and the other uninterruptible power supply devices to fail.

A chief object of the present invention is therefore to provide an uninterruptible power supply device that can prevent the load and the other uninterruptible power supply devices from failing when the bidirectional shopper fails, and an uninterruptible power supply system using the uninterruptible power supply device.

Solution to Problem

An uninterruptible power supply device according to the present invention is a three-phase four-wire uninterruptible power supply device configured to supply a three-phase AC voltage and a neutral-point voltage to a load. The uninterruptible power supply device includes: a converter configured to convert a three-phase AC voltage supplied from a commercial AC power supply into a first DC voltage, a second DC voltage, and a third DC voltage and output the first, second, and third DC voltages to a first DC bus, a second DC bus, and a third DC bus, respectively; a first capacitor connected between the first DC bus and the third DC bus; a second capacitor connected between the third DC bus and the second DC bus; an inverter configured to convert the first, second, and third DC voltages supplied through the first, second, and third DC buses into a three-phase AC voltage and supply the three-phase AC voltage to a load; and a bidirectional chopper connected between the first and second DC buses and a power storage device. The first DC voltage is higher than the second DC voltage, and the third DC voltage is an intermediate voltage between the first DC voltage and the second DC voltage and supplied as the neutral-point voltage to the load. The bidirectional chopper includes: a third capacitor and a fourth capacitor connected in series between the first DC bus and the second DC bus; a first transistor and a second transistor connected in series between the first DC bus and a first node between the third capacitor and the fourth capacitor; a third transistor and a fourth transistor connected in series between the first node and the second DC bus; a first diode, a second diode, a third diode, and a fourth diode connected in anti-parallel with the first transistor, the second transistor, the third transistor, and the fourth transistor, respectively; and a normal mode reactor including a first coil connected between a second node between the first transistor and the second transistor and a positive electrode of the power storage device, and a second coil connected between a negative electrode of the power storage device and a third node between the third transistor and the fourth transistor. The uninterruptible power supply device further includes a controller configured to perform a charging mode during a normal condition in which the commercial AC power supply supplies a three-phase AC voltage, the controller in the charging mode causing the first transistor and the fourth transistor to be complementarily turned on to charge the power storage device, and a discharging mode during an outage in which the commercial AC power supply stops supply of three-phase AC power, the controller in the discharging mode causing the second transistor and the third transistor to be complementarily turned on to discharge the power storage device. The controller in the discharging mode controls an ON period of at least one of the second transistor and the third transistor to cause a terminal-to-terminal voltage of the third capacitor to be equal to a terminal-to-terminal voltage of the fourth capacitor.

Advantageous Effects of Invention

In the uninterruptible power supply device of the present invention, the bidirectional chopper is not connected to the third DC bus. Therefore, even when the second transistor fails to be short-circuited, no current flows from the battery to the load and the other uninterruptible power supply devices and thus the load and the other uninterruptible power supply devices will not fail. Further, in the discharging mode, the ON period of at least one of the second transistor and the third transistor is controlled so that the terminal-to-terminal voltage of the third capacitor is equal to that of the fourth capacitor, and therefore, it will not occur that the terminal-to-terminal voltage of one of the third and fourth capacitors becomes excessively large.

DESCRIPTION OF EMBODIMENTS

Comparative Example

Figure 1:
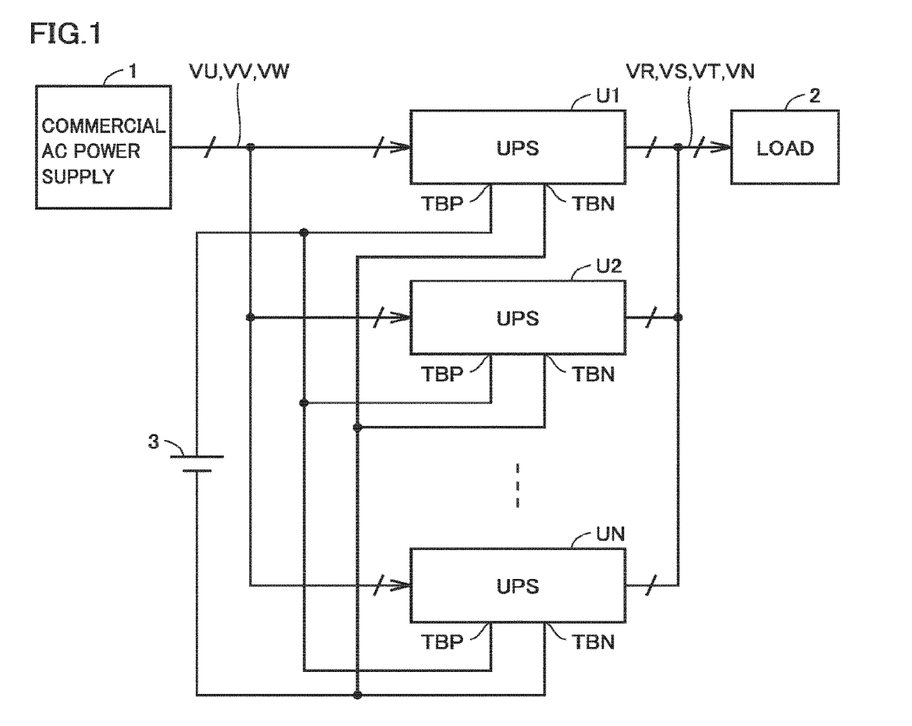
FIG. 1 is a circuit block diagram showing a configuration of an uninterruptible power supply system provided as a comparative example of the present invention.

For the sake of easy understanding of the present invention, a description of a comparative example of the present invention is given before a description of an embodiment of the present invention. FIG. 1 is a circuit block diagram showing a configuration of a three-phase four-wire uninterruptible power supply system provided as a comparative example of the present invention. In FIG. 1, the uninterruptible power supply system includes N (N is an integer of two or more) uninterruptible power supply devices (UPS) U1 to UN and a battery (power storage device) 3.

Uninterruptible power supply devices U1 to UN are connected in parallel between a commercial AC power supply 1 and a load 2, and share one battery 3. Commercial AC power supply 1 supplies three-phase AC power to each of uninterruptible power supply devices U1 to UN through a three-phase three-wire system. Each of uninterruptible power supply devices U1 to UN supplies three-phase AC power to load 2 through a three-phase four-wire system. The three-phase three-wire system is a power feeding system supplying three-phase AC power through three wires to which three-phase AC voltages are applied. The three-phase four-wire system is a power feeding system supplying three-phase AC power through four wires to which three-phase AC voltages and a neutral-point voltage are applied.

Specifically, commercial AC power supply 1 supplies three-phase AC voltages VU, VV, VW at a commercial frequency to each of uninterruptible power supply devices U1 to UN. Each of uninterruptible power supply devices U1 to UN receives three-phase AC voltages VU, VV, VW from commercial AC power supply 1 and outputs three-phase AC voltages VR, VS, VT at the commercial frequency and neutral-point voltage VN to load 2.

The number N of uninterruptible power supply devices U1 to UN is selected to enable, when one of the uninterruptible power supply devices fails for example, load 2 to keep operating by means of the remaining (N−1) uninterruptible power supply devices. Battery 3 stores DC power. Instead of battery 3, a capacitor may be connected.

During a normal condition in which commercial AC power supply 1 properly supplies three-phase AC power, each of uninterruptible power supply devices U1 to UN converts the three-phase AC power, which is supplied from commercial AC power supply 1 through the three-phase three-wire system, into DC power to supply the DC power to battery 3, and converts the DC power into three-phase AC power to supply the AC power to load 2. Load 2 is driven by the three-phase AC power supplied from uninterruptible power supply devices U1 to UN through the three-phase four-wire system. The current to be consumed by load 2 is supplied equally from N uninterruptible power supply devices U1 to UN.

During an outage in which commercial AC power supply 1 stops supply of the three-phase AC power, each of uninterruptible power supply devices U1 to UN converts the DC power of battery 3 into three-phase AC power to supply the AC power to load 2. Therefore, during the period in which battery 3 stores DC power, load 2 can continue operating.

Figure 2:
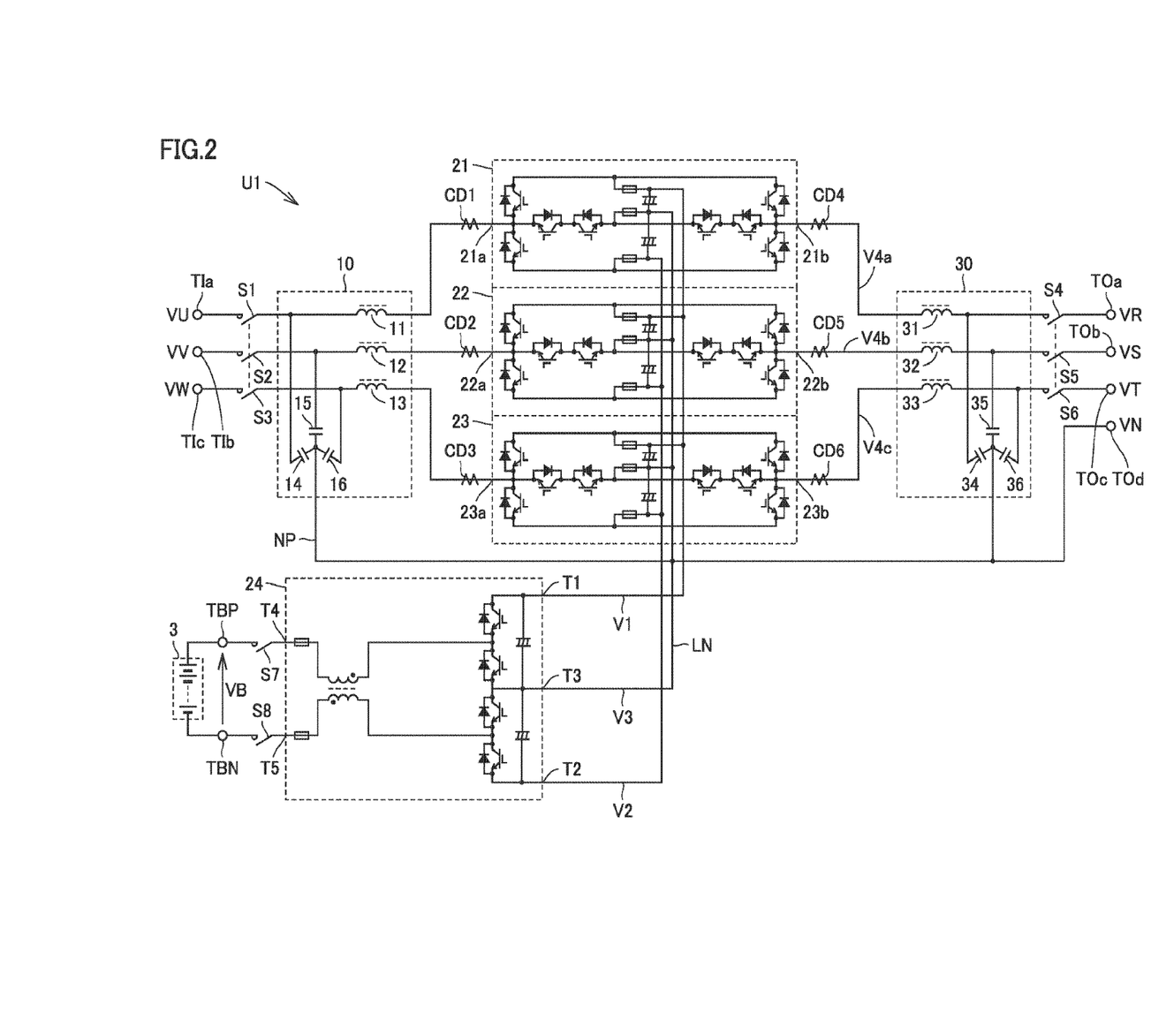
FIG. 2 is a circuit diagram showing a configuration of an uninterruptible power supply device shown in FIG. 1.

FIG. 2 is a circuit diagram showing a configuration of uninterruptible power supply device U1. Uninterruptible power supply devices U1 to UN have the same configuration. In FIG. 2, uninterruptible power supply device U1 includes input terminals TIa, TIb, TIc, output terminals TOa, TOb, TOc, TOd, and battery terminals TBP, TBN. Input terminals TIa, TIb, TIc receive three-phase AC voltages VU, VV, VW at the commercial frequency, respectively, from commercial AC power supply 1. Respective input terminals TIa of uninterruptible power supply devices U1 to UN are connected to one another, respective input terminals TIb are connected to one another, and respective input terminals TIc are connected to one another.

Output terminals TOa, TOb, TOc, and TOd are provided in order to output respective three-phase AC voltages VR, VS, VT at the commercial frequency and neutral-point voltage VN to load 2. Respective output terminals TOa of uninterruptible power supply devices U1 to UN are connected to one another, respective output terminals TOb are connected to one another, respective output terminals TOc are connected to one another, and respective output terminals TOd are connected to one another.

Battery terminals TBP and TBN are connected respectively to the positive electrode and the negative electrode of battery 3. Respective battery terminals TBP of uninterruptible power supply devices U1 to UN are connected to one another, and respective battery terminals TBN thereof are connected to one another.

Uninterruptible power supply device U1 further includes switches S1 to S8, an input filter 10, current detectors CD1 to CD6, power converters 21 to 23, a bidirectional chopper 24, and an output filter 30. Switches S1, S3, and S3 have respective first terminals connected to input terminals TIa, TIb, and TIc, respectively, and respective second terminals connected to input filter 10. During a normal condition, switches S1 to S3 are ON. When maintenance of uninterruptible power supply device U1 is to be performed, for example, switches S1 to S3 are made OFF.

Input filter 10 includes reactors 11 to 13 and capacitors 14 to 16. Reactors 11 to 13 have respective first terminals connected to the second terminals of switches S1 to S3, respectively, and respective second terminals connected to input terminals 21a to 23a of power converters 21 to 23, respectively. Capacitors 14 to 16 have respective first terminals connected to the first terminals of reactors 11 to 13, and respective second terminals connected commonly to a neutral point NP.

Reactors 11 to 13 and capacitors 14 to 16 form a low-pass filter. Input filter 10 allows three-phase AC power at the commercial frequency from commercial AC power supply 1 to pass through toward power converters 21 to 23, and prevents a signal at a switching frequency generated by power converters 21 to 23 from passing through toward commercial AC power supply 1.

Current detectors CD1 to CD3 detect respective instantaneous values of current flowing from commercial AC power supply 1 to input terminals 21a to 23a of power converters 21 to 23, and output signals indicative of the detected values to a controller (not shown). The controller (not shown) controls power converters 21 to 23 so that respective phases of AC voltages VU, VV, VW match the phases of the current detected by current detectors CD1 to CD3, specifically the power factor is 1.0.

During a normal condition in which commercial AC power supply 1 supplies three-phase AC power, power converters 21 to 23 convert the three-phase AC power supplied from commercial AC power supply 1 to input terminals 21a to 23a into DC power to supply the DC power to battery 3 through bidirectional chopper 24, and also convert the DC power into three-phase AC power to output the AC power to output terminals 21b to 23b.

During an outage in which commercial AC power supply 1 stops supply of the three-phase AC power, power converters 21 to 23 convert DC power supplied from battery 3 through bidirectional chopper 24 into three-phase AC power to output the AC power to output terminals 21b to 23b.

Specifically, during a normal condition, power converters 21 to 23 convert three-phase AC voltages VU, VV, VW which are supplied from commercial AC power supply 1 to input terminals 21a to 23a into DC voltages V1 to V3, and convert these DC voltages V1 to V3 into three-phase AC voltages V4a to V4c to output the AC voltages to output terminals 21b to 23b. During an outage, power converters 21 to 23 convert DC voltages V1 to V3 generated from DC power supplied from bidirectional chopper 24 into three-phase AC voltages V4a to V4c to output the AC voltages to output terminals 21b to 23b.

Bidirectional chopper 24 includes five terminals T1 to T5. Terminals T1 to T3 receive DC voltages V1 to V3 generated by power converters 21 to 23, respectively. Switches S7 and S8 have respective first terminals connected to terminals T4 and T5, respectively, and respective second terminal connected to battery terminals TBP and TBN, respectively. Battery terminals TBP and TBN are connected to the positive electrode and the negative electrode of battery 3, respectively. During a normal condition, switches S7 and S8 are ON. When maintenance of uninterruptible power supply device U1 or battery 3 is to be performed, for example, switches S7 and S8 are made OFF.

During a normal condition in which commercial AC power supply 1 supplies three-phase AC power, bidirectional chopper 24 stores, in battery 3, DC power generated by power converters 21 to 23. During an outage in which supply of the three-phase AC power from commercial AC power supply 1 is stopped, bidirectional chopper 24 supplies the DC power of battery 3 to power converters 21 to 23.

Specifically, during a normal condition, bidirectional chopper 24 steps down DC voltage VDC (=V1–V2) generated by power converters 21 to 23 to supply the resultant voltage to battery 3 and thereby charge battery 3. During an outage, bidirectional chopper 24 steps up terminal-to-terminal voltage VB of battery 3 to generate DC voltage VDC, and supplies DC voltage VDC to power converters 21 to 23 to discharge battery 3.

Current detectors CD4 to CD6 detect respective instantaneous values of output current from power converters 21 to 23. The values detected by current detectors CD4 to CD6 are supplied to the controller (not shown). The controller (not shown) communicates with other uninterruptible power supply devices U2 to UN and controls power converters 21 to 23 based on the values detected by current detectors CD4 to CD6, so that the load current is equally supplied from uninterruptible power supply devices U1 to UN.

Output filter 30 includes reactors 31 to 33 and capacitors 34 to 36. Reactors 31 to 33 have respective first terminals connected to output terminals 21b to 23b of power converters 21 to 23, respectively. Respective first terminals of capacitors 34 to 36 are connected to respective second terminals of reactors 31 to 33. Respective second terminals of capacitors 34 to 36 are connected commonly to neutral point NP. Neutral point NP is connected to output terminal TOd and also connected to terminal T3 through a wire LN. Therefore, DC voltage V3 is output, as neutral-point voltage VN, to output terminal TOd. Reactors 31 to 33 and capacitors 34 to 36 form a low-pass filter.

Output filter 30 allows three-phase AC power at the commercial frequency generated by power converters 21 to 23 to pass through toward load 2, and prevents a signal at a switching frequency generated by power converters 21 to 23 from passing through toward load 2. Specifically, output filter 30 converts AC voltages V4a to V4c generated by power converters 21 to 23 into sinusoidal three-phase AC voltages VR, VS, VT to supply the AC voltages to load 2.

Switches S4 to S6 have respective first terminals connected to respective second terminals of reactors 31 to 33 and respective second terminals connected to output terminals TOa to TOc, respectively. During a normal condition, switches S4 to S6 are ON. When maintenance of uninterruptible power supply device U1 is to be performed, for example, switches S4 to S6 are made OFF.

Figure 3:
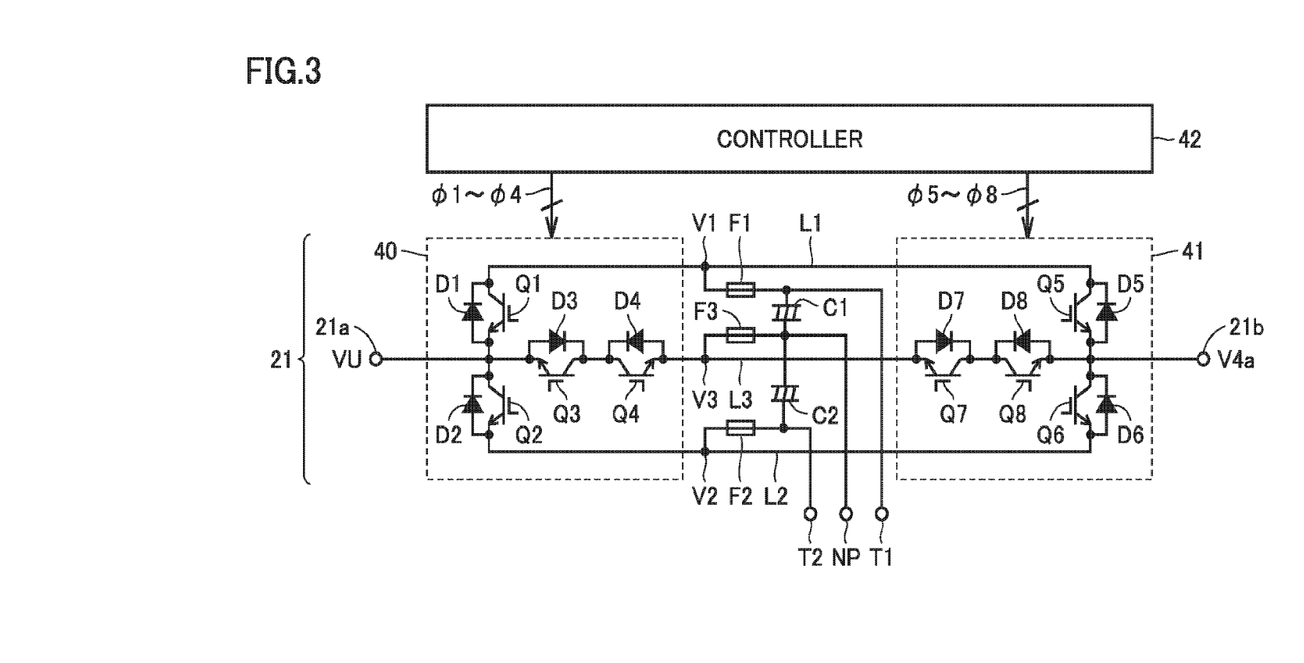
FIG. 3 is a circuit block diagram showing a configuration of a power converter shown in FIG. 2.

FIG. 3 is a circuit block diagram showing a configuration of power converter 21. In FIG. 3, power converter 21 includes an input terminal 21a, a converter 40, a DC positive bus L1, a DC negative bus L2, a DC neutral point bus L3, capacitors C1, C2, fuses F1 to F3, an inverter 41, and an output terminal 21b. Power converter 21 is controlled by a controller 42.

Controller 42 generates PWM (pulse width modulation) signals φ1 to φ8 for controlling converter 40 and inverter 41 based on an instantaneous value of AC voltage VU supplied to input terminal 21a, respective instantaneous values of DC voltages V1 to V3 on buses L1 to L3, an instantaneous value of voltage VR on output terminal TOa, and values detected by current detectors CD1, CD4, for example.

Converter 40 includes transistors Q1 to Q4 and diodes D1 to D4. Transistors Q1 to Q4 are each an IGBT (Insulated Gate Bipolar Transistor), for example. Transistor Q1 has a collector connected to DC positive bus L1 and an emitter connected to input terminal 21a. Diode D1 has an anode connected to input terminal 21a and a cathode connected to DC positive bus L1. In other words, diode D1 is connected in anti-parallel with transistor Q1.

Transistor Q2 has a collector connected to input terminal 21a and an emitter connected to DC negative bus L2. Diode D2 has an anode connected to DC negative bus L2 and a cathode connected to input terminal 21a. In other words, diode D2 is connected in anti-parallel with transistor Q2.

Respective collectors of transistors Q3, Q4 are connected to each other, and respective emitters of transistors Q3, Q4 are connected to input terminal 21a and DC neutral point bus L3, respectively. Diodes D3, D4 have respective cathodes connected to the emitters of transistors Q3, Q4, and respective anodes connected to input terminal 21a and DC neutral point bus L3, respectively. In other words, diodes D3 and D4 are connected in anti-parallel with transistors Q3 and Q4, respectively. Transistors Q3, Q4 and diodes D3, D4 form a bidirectional switch.

Respective gates of transistors Q1 to Q4 receive PWM signals ϕ1 to ϕ4 from controller 42. PWM signals ϕ1 to ϕ4 are generated in synchronization with AC voltage VU and have a frequency sufficiently higher than that of AC voltage VU. PWM signals ϕ1 and ϕ4 are complementary to each other, and PWM signals ϕ2 and ϕ3 are complementary to each other.

When AC voltage VU is a positive voltage, for example, PWM signals ϕ1 and ϕ4 are alternately set to "H" level and PWM signals ϕ2 and ϕ3 are fixed at "L" level and "H" level, respectively. Accordingly, transistors Q1 and Q4 are alternately turned on and transistors Q2 and Q3 are fixed in the OFF state and the ON state, respectively.

When AC voltage VU is a negative voltage, PWM signals ϕ2 and ϕ3 are alternately set to "H" level and PWM signals ϕ1 and ϕ4 are fixed at "L" level and "H" level, respectively. Accordingly, transistors Q2 and Q3 are alternately turned on and transistors Q1 and Q4 are fixed in the OFF state and the ON state, respectively.

In one cycle of the PWM signal, the ratio between the time for which the PWM signal is at "H" level and the period of one cycle of the PWM signal is called duty ratio. Controller 42 controls the duty ratio of PWM signals ϕ1 to ϕ4 in synchronization with AC voltage VU to cause AC voltage VU to be converted into DC voltages V1 to V3. DC voltages V1 to V3 are supplied to DC positive bus L1, DC negative bus L2, and DC neutral point bus L3, respectively. V1>V3>V2 and V3=(V1+V2)/2 hold. When DC neutral point bus L3 is grounded, DC voltages V1, V2, and V3 are a positive voltage, a negative voltage, and 0 V, respectively.

During a normal condition in which commercial AC power supply 1 supplies AC voltage VU, controller 42 controls transistors Q1 to Q4 of converter 40 to cause AC voltage VU to be converted into DC voltages V1 to V3. During an outage in which commercial AC power supply 1 stops supply of AC voltage VU, controller 42 fixes transistors Q1 to Q4 in the OFF state to cause operation of converter 40 to be kept stopped.

Fuses F1 to F3 have respective first terminals connected to buses L1 to L3, respectively. Respective second terminals of fuses F1, F2 are connected to terminals T1, T2 of bidirectional chopper 24, respectively, and a second terminal of fuse F3 is connected to neutral point NP. In this comparative example, neutral point NP is connected to output terminal TOd and also to terminal T3 of bidirectional chopper 24 through wire LN.

Fuses F1 to F3 are blown when overcurrent flows between bus L1 and terminal T1, between bus L2 and terminal T2, and between bus L3 and neutral point NP to protect uninterruptible power supply device U1. Capacitor C1 is connected between respective second terminals of fuses F1 and F3 to smooth and stabilize the DC voltage between buses L1 and L3. Capacitor C2 is connected between respective second terminals of fuses F3 and F2 to smooth and stabilize the DC voltage between buses L3 and L2.

Inverter 41 includes transistors Q5 to Q8 and diodes D5 to D8. Transistors Q5 to Q8 are each an IGBT, for example. Transistor Q5 has a collector connected to DC positive bus L1 and an emitter connected to output terminal 21b. Diode D5 has an anode connected to output terminal 21b and a cathode connected to DC positive bus L1.

Transistor Q6 has a collector connected to output terminal 21b and an emitter connected to DC negative bus L2. Diode D6 has an anode connected to DC negative bus L2 and a cathode connected to output terminal 21b. In other words, diodes D5 and D6 are connected in anti-parallel with transistors Q5 and Q6, respectively.

Respective collectors of transistors Q7, Q8 are connected to each other, and respective emitters of transistors Q7, Q8 are connected to DC neutral point bus L3 and output terminal 21b, respectively. Diodes D7, D8 have respective cathodes connected to the collectors of transistors Q7, Q8, and respective anodes connected to DC neutral point bus L3 and output terminal T14, respectively. In other words, diodes D7 and D8 are connected in anti-parallel with transistors Q7 and Q8, respectively. Transistors Q7, Q8 and diodes D7, D8 form a bidirectional switch.

Figure 4:
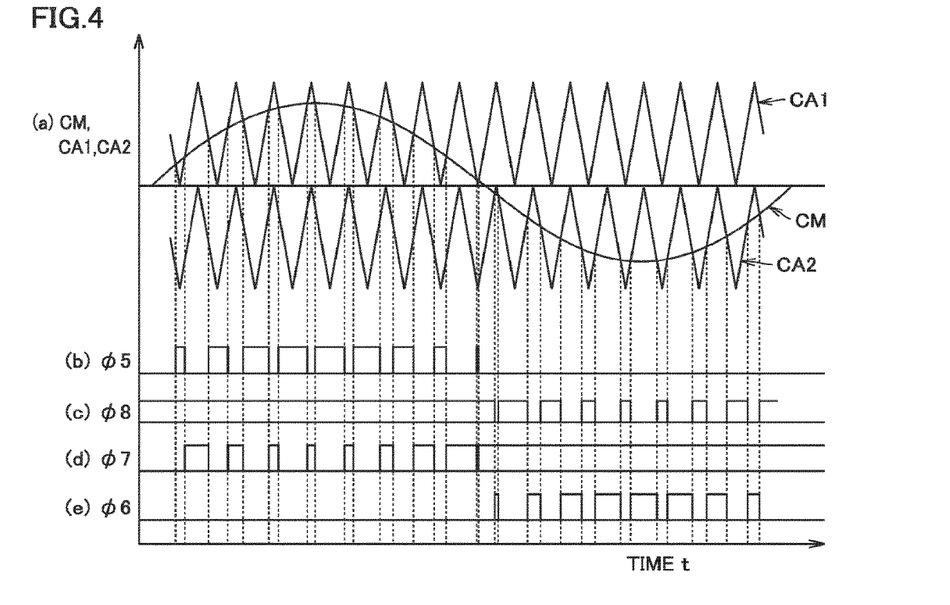
FIG. 4 is a time chart showing respective waveforms of PWM signals for controlling an inverter shown in FIG. 3.

Next, an operation of inverter 41 is described. Respective gates of transistors Q5 to Q8 receive PWM signals ϕ5 to ϕ8 from controller 42. FIGS. 4 (a) to (e) illustrate how PWM signals ϕ5 to ϕ8 are generated and respective waveforms of these signals. Specifically, FIG. 4 (a) shows respective waveforms of sinusoidal command value signal CM, positive triangular wave carrier signal CA1, and negative triangular wave carrier signal CA2, and FIG. 4 (b) to (e) show respective waveforms of PWM signals ϕ5, ϕ8, ϕ7, and ϕ6.

Referring to FIG. 4 (a) to (e), the frequency of sinusoidal command value signal CM is the commercial frequency, for example. Sinusoidal command value signal CM is in synchronization with AC voltage VU. Carrier signals CA1 and CA2 have the same period and are in phase. The period of carrier signals CA1, CA2 is sufficiently smaller than the period of sinusoidal command value signal CM.

The level of sinusoidal command value signal CM is compared with the level of positive triangular wave carrier signal CA1. When the level of sinusoidal command value signal CM is higher than the level of positive triangular wave carrier signal CA1, PWM signals ϕ5 and ϕ7 are set to "H" level and "L" level, respectively. When the level of sinusoidal command value signal CM is lower than the level of positive triangular wave carrier signal CA1, PWM signals ϕ5 and ϕ7 are set to "L" level and "H" level, respectively.

Therefore, in the period in which sinusoidal command value signal CM has a positive level, PWM signals ϕ5 and ϕ7 are alternately set to "H" level in synchronization with carrier signal CA1 and transistors Q5 and Q7 are alternately turned on. In the period in which sinusoidal command value signal CM has a negative level, PWM signals ϕ5 and ϕ7 are fixed at "L" level and "H" level, respectively, transistor Q5 is fixed in the OFF state, and transistor Q7 is fixed in the ON state.

The level of sinusoidal command value signal CM is compared with the level of negative triangular wave carrier signal CA2. When the level of sinusoidal command value signal CM is higher than the level of negative triangular wave carrier signal CA2, PWM signals φ6 and φ8 are set to "L" level and "H" level, respectively. When the level of sinusoidal command value signal CM is lower than the level of negative triangular wave carrier signal CA2, PWM signals φ6 and φ8 are set to "H" level and "L" level, respectively.

Therefore, in the period in which sinusoidal command value signal CM has a positive level, PWM signals φ6 and φ8 are fixed at "L" level and "H" level, respectively, transistor Q6 is fixed in the OFF state, and transistor Q8 is fixed in the ON state. In the period in which sinusoidal command value signal CM has a negative level, PWM signals φ6 and φ8 are alternately set to "H" level in synchronization with carrier signal CA2, and transistors Q6 and Q8 are alternately turned on.

In one cycle of the PWM signal, the ratio between the time for which the PWM signal is at "H" level and the period of one cycle of the PWM signal is called duty ratio. In the period in which sinusoidal command value signal CM has a positive level, PWM signal φ5 has the largest duty ratio around the positive peak (90 degrees) of sinusoidal command value signal CM. As the distance from the positive peak increases, the duty ratio of PWM signal φ5 decreases. The duty ratio is zero around 0 degrees and 180 degrees. In the period in which sinusoidal command value signal CM has a negative level, the duty ratio of PWM signal φ5 is fixed at zero. PWM signal φ7 is a complementary signal to PWM signal φ5.

In the period in which sinusoidal command value signal CM has a positive level, the duty ratio of PWM signal φ6 is fixed at zero. PWM signal φ6 has the largest duty ratio around the negative peak (270 degrees) of sinusoidal command value signal CM. As the distance from the negative peak increases, the duty ratio of PWM signal φ6 decreases. The duty ratio is zero around 180 degrees and 360 degrees. PWM signal φ8 is a complementary signal to PWM signal φ6.

For example, when AC voltage VU is a positive voltage, PWM signals φ5 and φ7 are alternately set to "H" level and PWM signals φ6 and φ8 are fixed at "L" level and "H" level, respectively. Accordingly, transistors Q5 and Q7 are alternately turned on and transistors Q6 and Q8 are fixed in the OFF state and the ON state, respectively.

When AC voltage VU is a negative voltage, PWM signals φ6 and φ8 are alternately set to "H" level and PWM signals φ5 and φ7 are fixed at "L" level and "H" level, respectively. Accordingly, transistors Q6 and Q8 are alternately turned on and transistors Q5 and Q7 are fixed in the OFF state and the ON state, respectively. Controller 42 controls the duty ratio of PWM signals φ5 to φ8 in synchronization with AC voltage VU and causes DC voltages V1 to V3 to be converted into AC voltages V4a of three levels.

Respective configurations of power converters 22, 23 are identical to the configuration of power converter 21 except for the following. Power converter 22 is controlled in synchronization with AC voltage VV and outputs AC voltage V4b that is in synchronization with AC voltage VV to output terminal 22b. Power converter 23 is controlled in synchronization with AC voltage VW and outputs AC voltage V4c that is in synchronization with AC voltage VW to output terminal 22c.

Input filter 10 and converters 40 of power converters 21 to 23 form a three-phase converter converting three-phase AC voltages VU, VV, VW supplied from commercial AC power supply 1 into DC voltages V1 to V3. Inverters 41 of power converters 21 to 23 and output filter 30 form a three-phase inverter converting DC voltages V1 to V3 into three-phase AC voltages VR, VS, VT to supply the AC voltages to load 2.

Figure 5:
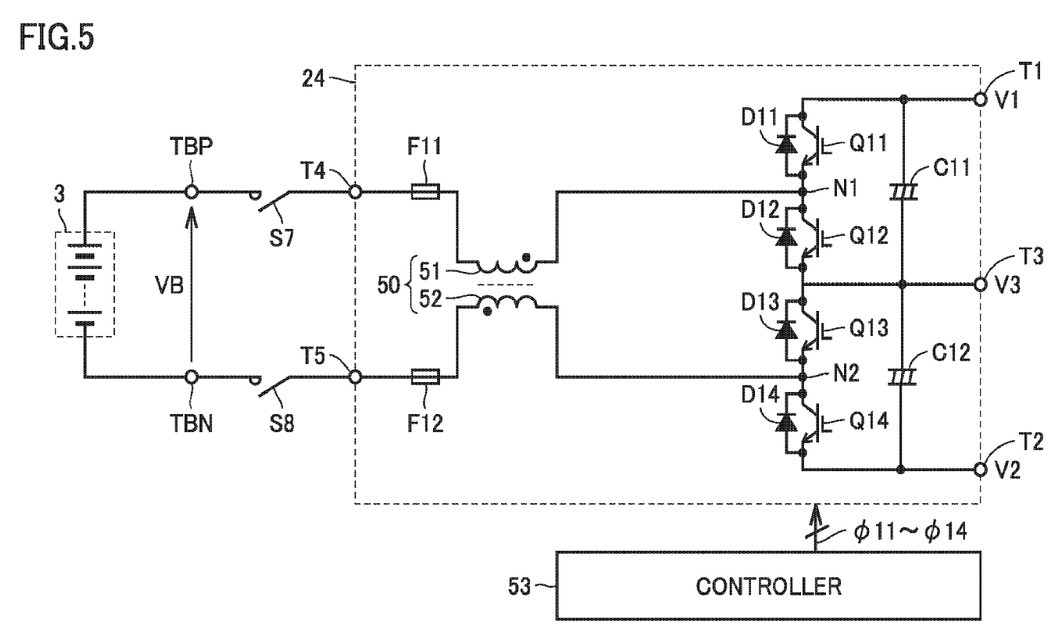
FIG. 5 is a circuit block diagram showing a configuration of a bidirectional chopper shown in FIG. 2.

FIG. 5 is a circuit block diagram showing a configuration of bidirectional chopper 24. In FIG. 5, bidirectional chopper 24 includes terminals T1 to T5, capacitors C11, C12, transistors Q11 to Q14, diodes D11 to D14, a normal mode reactor 50, and fuses F11, F12. Normal mode reactor 50 includes two coils 51, 52.

Bidirectional chopper 24 is controlled by a controller 53. Controller 53 generates PWM signals φ11 to φ14 for controlling transistors Q11 to Q14 based on an instantaneous value of DC voltage VDC (=V1−V2) between terminals T1 and T2 (namely between buses L1 and L2), and terminal-to-terminal voltage VB of battery 3, for example.

Terminals T1, T2 are connected respectively to DC positive bus L1 and DC negative bus L2 of each of power converters 21 to 23. Terminal T3 is connected to neutral point NP through wire LN. Neutral point NP is connected to DC neutral point bus L3 of each of power converters 21 to 23 and also to output terminal TOd. Terminal T4 is connected to the positive electrode of battery 3 through switch S7 and battery terminal TBP. Terminal T5 is connected to the negative electrode of battery 3 through switch S8 and battery terminal TBN.

Capacitor C11 is connected between terminals T1 and T3 to smooth and stabilize the voltage between terminals T1 and T3. Capacitor C12 is connected between terminals T3 and T2 to smooth and stabilize the voltage between terminals T3 and T2. Capacitors C11 and C12 are charged respectively to the same voltages as capacitors C1 and C2 of power converters 21 to 23.

Transistors Q11 to Q14 are each an IGBT, for example. Transistors Q11, Q12 are connected in series between terminals T1 and T3, and transistors Q13, Q14 are connected in series between terminals T3 and T2. Diodes D11 to D14 are connected in anti-parallel with transistors Q11 to Q14, respectively.

Coil 51 has a first terminal connected to a node N1 between transistors Q11 and Q12 and a second terminal connected to terminal T4 through fuse F11. Coil 52 has a first terminal connected to terminal T5 through fuse F12 and a second terminal connected to a node N2 between transistors Q13 and Q14. Fuses F11, F12 are blown when overcurrent flows to protect battery 3 and bidirectional chopper 24, for example.

During a normal condition in which commercial AC power supply 1 supplies three-phase AC power, DC power is supplied from capacitors C1, C2 to battery 3 through bidirectional chopper 24 to charge battery 3. In this case, transistors Q12, Q13 are fixed in the OFF state and transistors Q11, Q14 are alternately turned on.

At this time, the duty ratio of PWM signals φ11, φ14 is controlled so that terminal-to-terminal voltage VB of battery 3 is equal to a predetermined target voltage VBT. Increase of the duty ratio of PWM signals φ11, φ14 causes increase of the current flowing from capacitors C11, C12 to battery 3. Decrease of the duty ratio of PWM signals φ11, φ14 causes decrease of the current flowing from capacitors C11, C12 to battery 3.

Specifically, in a first battery charging mode, PWM signals φ12 to φ14 are set to "L" level to cause transistors Q12 to Q14 to be turned off, and PWM signal φ11 is set to "H" level to cause transistor Q11 to be turned on. Accordingly, current flows from terminal T1 to terminal T3 through transistor Q11, coil 51, fuse F11, switch S7, battery 3, switch S8, fuse F12, coil 52, and diode D13, and capacitors C1, C11 are discharged to charge battery 3.

In a second battery charging mode, PWM signals φ12, φ13 are set to "L" level to cause transistors Q12 to Q13 to be turned off, and PWM signals φ11, φ14 are set to "H" level to cause transistors Q11, Q14 to be turned on. Accordingly, current flows from terminal T1 to terminal T2 through transistor Q11, coil 51, fuse F11, switch S7, battery 3, switch S8, fuse F12, coil 52, and transistor Q14, and capacitors C1, C2, C11, C12 are discharged to charge battery 3.

In a third battery charging mode, PWM signals φ11 to φ13 are set to "L" level to cause transistors Q11 to Q13 to be turned off, and PWM signal φ14 is set to "H" level to cause transistor Q14 to be turned on. Accordingly, current flows form terminal T3 to terminal T2 through diode D12, coil 51, fuse F11, switch S7, battery 3, switch S8, fuse F12, coil 52, and transistor Q14, and capacitors C2 and C12 are discharged to charge battery 3.

The first battery charging mode and the third battery charging mode are performed by turns. In the period between the first battery charging mode and the third battery charging mode, PWM signals φ11 to φ14 are set to "L" level to cause transistors Q11 to Q14 to be turned off. Then, electromagnetic energy stored in coils 51, 52 is discharged, and current flows in a path through diode D12, coil 51, fuse F11, switch S7, battery 3, switch S8, fuse F12, coil 52, and diode D13 to charge battery 3. The second battery charging mode is a mode in which the first battery charging mode and the third battery charging mode overlap.

When supply of three-phase AC power from commercial AC power supply 1 is stopped, battery 3 supplies DC power to capacitors C1, C2, C11, C12 through bidirectional chopper 24, and thus battery 3 is discharged and capacitors C1, C2, C11, C12 are charged. In this case, transistors Q11, Q14 are fixed in the OFF state and transistors Q12, Q13 are alternately turned on.

At this time, the duty ratio of PWM signals φ12, φ13 is controlled so that DC voltage VDC (=V1–V2) between terminals T1 and T2 is equal to a predetermined target voltage VDCT. Increase of the duty ratio of PWM signals φ12, φ13 causes increase of the current flowing from battery 3 to capacitors C11, C12. Decrease of the duty ratio of PWM signals φ12, φ13 causes decrease of the current flowing from battery 3 to capacitors C11, C12.

Specifically, in a first battery discharging mode, PWM signals φ11, φ13, φ14 are set to "L" level to cause transistors Q11, Q13, Q14 to be turned off, and PWM signal φ12 is set to "H" level to cause transistor Q12 to be turned on. Accordingly, current flows from the positive electrode of battery 3 to the negative electrode of battery 3 through switch S7, fuse F11, coil 51, transistor Q12, capacitors C2, C12, diode D14, coil 52, fuse F12, and switch S8, and thus battery 3 is discharged and capacitors C2, C12 are charged.

In a second battery discharging mode, PWM signals φ11 to φ14 are set to "L" level to cause transistors Q11 to Q14 to be turned off. Accordingly, current flows from the positive electrode of battery 3 to the negative electrode of battery 3 through switch S7, fuse F11, coil 51, diode D11, capacitors C1, C2, C11, C12, diode D14, coil 52, fuse F12, and switch S8. Thus, electromagnetic energy stored in coils 51, 52 is discharged and battery 3 is discharged to charge capacitors C1, C2, C11, C12.

In a third battery discharging mode, PWM signals φ11, φ12, φ14 are set to "L" level to cause transistors Q11, Q12, Q14 to be turned off, and PWM signal φ13 is set to "H" level to cause transistor Q13 to be turned on. Accordingly, current flows from the positive electrode of battery 3 to the negative electrode of battery 3 through switch S7, fuse F11, coil 51, diode D11, capacitors C1, C11, transistor Q13, coil 52, fuse F12, and switch S8. Thus, battery 3 is discharged and capacitors C1, C11 are charged.

The first battery discharging mode and the third battery discharging mode are performed by turns. When voltage V1–V2 between terminals T1 and T2 is lower than terminal-to-terminal voltage VB of battery 3 in the period between the first battery discharging mode and the third battery discharging mode, the second battery discharging mode is performed.

Next, an operation of uninterruptible power supply device U1 shown in FIGS. 1 to 5 is described. During a normal condition in which commercial AC power supply 1 properly supplies three-phase AC power, three-phase AC voltages VU, VV, VW from commercial AC power supply 1 are supplied to power converters 21 to 23 through switches S1 to S3 and input filter 10. Three-phase AC voltages VU, VV, VW are converted into DC voltages V1 to V3 by respective converters 40 of power converters 21 to 23.

In each of power converters 21 to 23, the DC power generated by converter 40 is stored in battery 3 through bidirectional chopper 24 and switches S7 and S8, and also supplied to inverter 41. Inverter 41 converts the DC power into AC power at the commercial frequency. Three-phase AC voltages V4a to V4c generated by respective inverters 41 of power converters 21 to 23 are converted into sinusoidal three-phase AC voltages VR, VS, VT by output filter 30 and supplied to load 2 through switches S4 to S6. Further, DC voltage V3 generated by power converters 21 to 23 is supplied as neutral-point voltage VN to load 2. Load 2 is driven by three-phase AC voltages VU, VV, VW and neutral-point voltage VN, namely the AC power supplied through the three-phase four-wire system.

During an outage in which commercial AC power supply 1 stops supply of three-phase AC power, operation of respective converters 40 of power converters 21 to 23 are stopped, and DC power of battery 3 is supplied to respective inverters 41 of power converters 21 to 23 through switches S7, S8 and bidirectional chopper 24. The DC power is then converted by respective inverters 41 of power converters 21 to 23 into three-phase AC power at the commercial frequency.

Three-phase AC voltages V4a to V4c generated by inverters 41 of power converters 21 to 23 are converted by output filter 30 into sinusoidal three-phase AC voltages VR, VS, VT and supplied to load 2 through switches S4 to S6. Further, DC voltage V3 on DC neutral-point bus L3 of power converters 21 to 23 is supplied as neutral-point voltage VN to load 2. Load 2 is driven by three-phase AC voltages VR, VS, VT and neutral-point voltage VN, namely the AC power supplied through the three-phase four-wire system.

Thus, even when an outage occurs, operation of load 2 is continued as long as battery 3 stores DC power. When supply of AC power from commercial AC power supply 1 is restarted, operation of converters 40 of power converters 21 to 23 is restarted. In each of power converters 21 to 23, converter 40 generates DC power, and the DC power is supplied to battery 3 through bidirectional chopper 24 and switches S7, S8, and also supplied to inverter 41. Thus, the original condition is recovered. The configuration and operation of each of the other uninterruptible power supply devices U2 to UN are identical to those of uninterruptible power supply device U1, and therefore, the description thereof is not repeated.

A problem with the uninterruptible power supply system of the comparative example is described. For example, it is supposed that transistor Q12 of bidirectional chopper 24 in uninterruptible power supply device U1 fails to be short-circuited. In this case, current flows from the positive electrode of battery 3 to load 2 and each of other uninterruptible power supply devices U2 to UN through switch S7, fuse F11, coil 51, transistor Q12, wire LN, neutral point NP, and output terminal TOd.

For example, the current flowing into output terminal TOd of uninterruptible power supply device U2 flows to the negative electrode of battery 3 through neutral point NP, wire LN, capacitor C12, diode D14, coil 52, and fuse F12 of bidirectional chopper 24, and switch S8. Accordingly, DC power of battery 3 may be discharged and load 2 and other uninterruptible power supply devices U2 to UN may fail. The present invention solves this problem.

Embodiment

Figure 6:
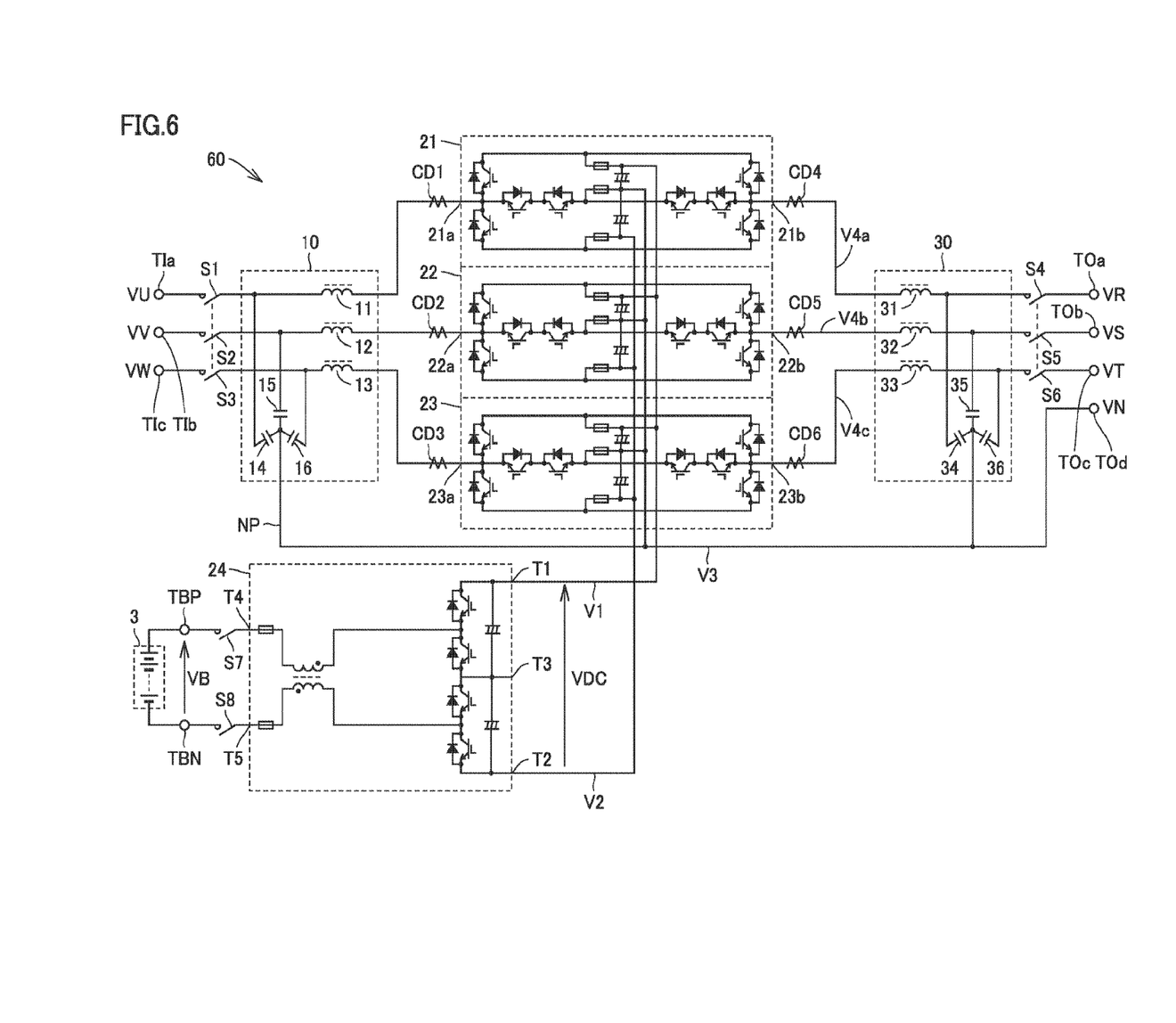
FIG. 6 is a circuit diagram showing a configuration of an uninterruptible power supply device included in an uninterruptible power supply system according to an embodiment of the present invention.

FIG. 6 is a circuit diagram showing a configuration of an uninterruptible power supply device 60 included in the uninterruptible power supply system according to an embodiment to be contrasted with FIG. 2. An uninterruptible power supply system of the present embodiment includes uninterruptible power supply devices 60 replacing uninterruptible power supply devices U1 to UN shown in FIG. 1.

In uninterruptible power supply device U1 of the comparative example, neutral point NP and terminal T3 of bidirectional chopper 24 are connected to each other by wire LN (see FIG. 2). In contrast, in uninterruptible power supply device 60 of the present embodiment, there is no wire connecting neutral point NP and terminal T3 of bidirectional shopper 24 to each other (see FIG. 6). Therefore, even when transistor Q12 of bidirectional chopper 24 fails to be short-circuited, no current flows from battery 3 to load 2 and other uninterruptible power supply devices 60 through failing transistor Q12.

However, the mere absence of wire LN between terminal T3 of bidirectional chopper 24 and neutral point NP does not allow capacitors C11, C12 to be equally charged when DC power is discharged from battery 3. Consequently, the terminal-to-terminal voltage of one of capacitors C11 and C12 becomes excessively large and capacitor C11 or C12 may be broken. In view of this, the present embodiment controls the ON period of transistors Q12, Q13 so that terminal-to-terminal voltage V11 of capacitor C11 is equal to terminal-to-terminal voltage V12 of capacitor C12 when the battery is discharged.

Figure 7:
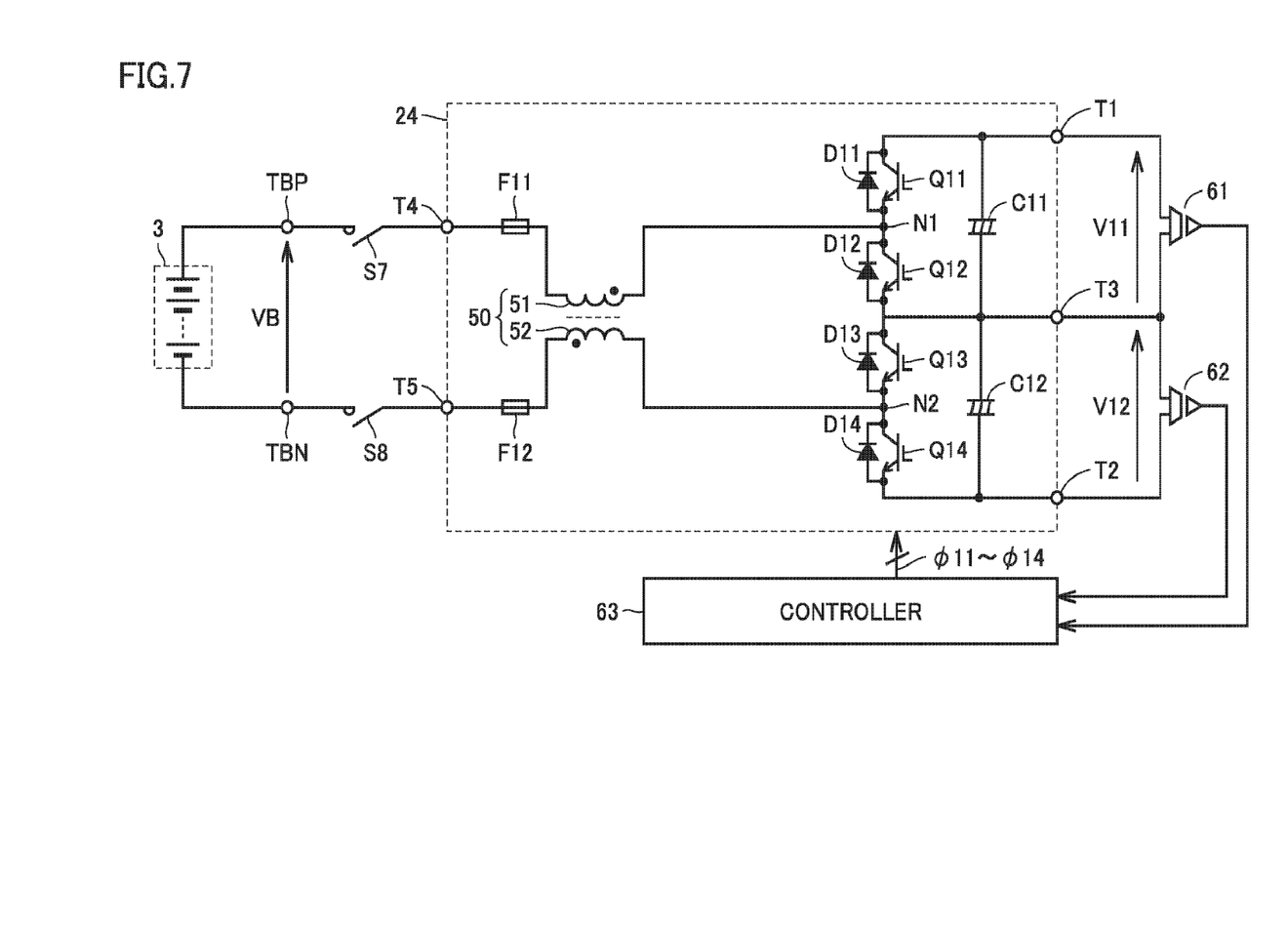
FIG. 7 is a circuit block diagram showing components involved in a bidirectional chopper shown in FIG. 6 and its control.

FIG. 7 is a circuit block diagram showing components involved in bidirectional chopper 24 and its control to be contrasted with FIG. 5. In FIG. 7, in order to control bidirectional chopper 24, a controller 63 and voltage detectors 61, 62 are provided. Voltage detector 61 detects an instantaneous value of terminal-to-terminal voltage V11 of capacitor C11 and provides a signal indicative of the detected value to controller 63. Voltage detector 62 detects an instantaneous value of terminal-to-terminal voltage V12 of capacitor C12 and provides a signal indicative of the detected value to controller 63.

Like controller 53 of the comparative example, controller 63 causes PWM signals $\phi 11$, $\phi 14$ to be alternately set to "H" level and thereby cause transistors Q11, Q14 to be alternately turned on in a charging mode in which battery 3 is charged with DC power, and causes PWM signals $\phi 12$, $\phi 13$ to be alternately set to "H" level and thereby cause transistors Q12, Q13 to be alternately turned on in a discharging mode in which DC power of battery 3 is discharged.

Controller 63 differs from controller 53 of the comparative example in the following respect. Specifically, in the discharging mode, controller 53 of the comparative example controls the duty ratio of PWM signals $\phi 12$, $\phi 13$ so that DC voltage VDC between terminals T1 and T2 is equal to target voltage VDCT. In the comparative example, the duty ratio of PWM signal $\phi 12$ is equal to the duty ratio of PWM signal $\phi 13$.

In contrast, in the discharging mode, controller 63 of the present embodiment controls the duty ratio of PWM signals $\phi 12$, $\phi 13$ so that DC voltage VDC between terminals T1 and T2 is equal to target voltage VDCT and terminal-to-terminal voltage V11 of capacitor C11 is equal to terminal-to-terminal voltage V12 of capacitor C12. In the present embodiment, respective duty ratios of PWM signals $\phi 12$ and $\phi 13$ are equal to each other when V11=V12 holds. However, when V11≠V12 holds, respective duty ratios of PWM signals $\phi 12$ and $\phi 13$ are not equal to each other.

Figure 8:
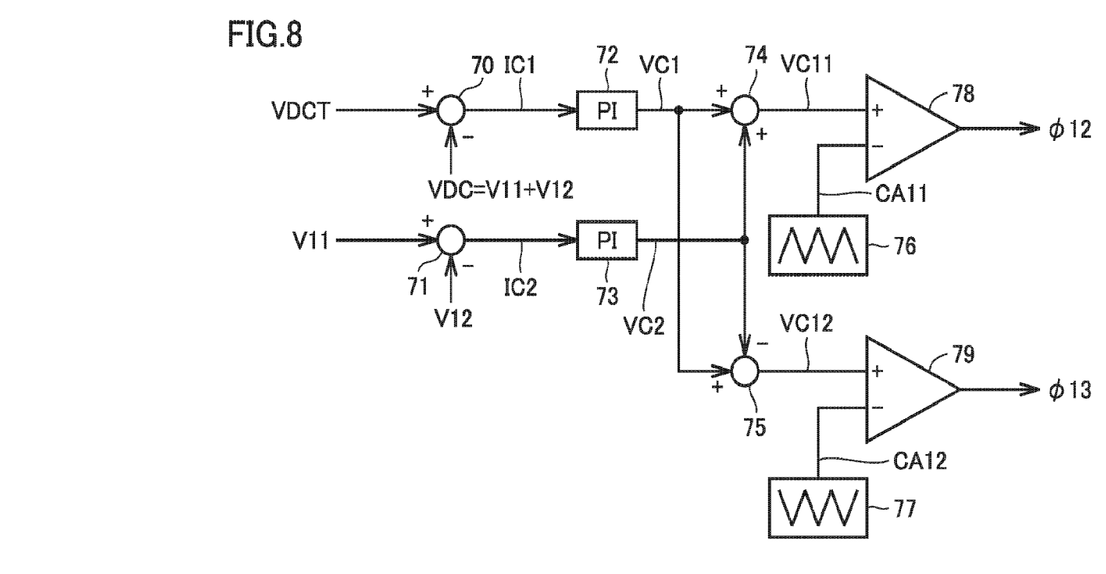
FIG. 8 is a block diagram showing components involved in discharging of a battery that are included in a controller shown in FIG. 7.

FIG. 8 is a block diagram showing a configuration of components involved in discharging of battery 3 that are included in controller 63. In FIG. 8, controller 63 includes subtractors 70, 71, 75, control units (PI) 72, 73, an adder 74, triangular-wave generators 76, 77, and comparators 78, 79.

Subtractor 70 subtracts, from target value VDCT of DC voltage VDC between terminals T1 and T2, the detected value of DC voltage VDC=V11+V12 to generate current command value IC1. Control unit 72 performs PI control (proportional integral control) for example on current command value IC1 to generate voltage command value VC1.

Subtractor 71 subtracts the detected value of terminal-to-terminal voltage V12 of capacitor C12 from the detected value of terminal-to-terminal voltage V11 of capacitor C11 to generate current command value IC2. Control unit 73 performs PI control (proportional integral control) for example on current command value IC2 to generate voltage command value VC2.

Adder 74 adds together voltage command value VC1 and voltage command value VC2 to generate voltage command value VC11. Subtractor 75 subtracts voltage command value VC2 from voltage command value VC1 to generate voltage command value VC12.

Triangular wave generator 76 generates triangular wave signal CA11 having a sufficiently higher frequency than the commercial frequency. Triangular wave generator 77 generates triangular wave signal CA12 having the same frequency as the frequency of triangular wave signal CA11. The phase shift between triangular wave signals CA11 and CA12 is 180° C.

Comparator 78 compares the level of voltage command value VC11 with the level of triangular wave signal CA11. When VC11>CA11 holds, comparator 78 sets PWM signal $\phi 12$ to "H" level. When VC11<CA11 holds, comparator 78 sets PWM signal $\phi 12$ to "L" level.

Comparator 79 compares the level of voltage command value VC12 with the level of triangular wave signal CA12. When VC12>CA12 holds, comparator 79 sets PWM signal $\phi 13$ to "H" level. When VC12<CA12 holds, comparator 79 sets PWM signal $\phi 13$ to "L" level.

Thus, when capacitors C11 and C12 are equally charged and thus V11=V12 holds, IC2=0, VC2=0, and VC1=VC11=VC12 hold and respective duty ratios of PWM signals $\phi 12$ and $\phi 13$ are equal to each other. In this case, the ON period per cycle of transistor Q12 is equal to the ON period per cycle of transistor Q13.

When capacitors C11 and C12 are not equally charged and thus V11>V12 holds, VC2>0 and VC11>VC12 hold and the duty ratio of PWM signal φ12 is larger than the duty ratio of PWM signal φ13. Then, transistors Q12, Q13 are controlled so that the ON period per cycle of transistor Q12 is longer than the ON period per cycle of transistor Q13 to decrease V11 and increase V12 and thereby reduce the difference between V11 and V12.

When capacitors C11 and C12 are not equally charged and thus V11<V12 holds, VC2<0 and VC11<VC12 hold and the duty ratio of PWM signal φ12 is smaller than the duty ratio of PWM signal φ13. Then, transistors Q12, Q13 are controlled so that the ON period per cycle of transistor Q12 is shorter than the ON period per cycle of transistor Q13 to increase V11 and decrease V12 and thereby reduce the difference between V11 and V12.

When V11=V12 holds and the detected value of DC voltage VDC=V11+V12 reaches target voltage VDCT, VC1=0, VC2=0, VC11=0, and VC12=0 hold. Then, the duty ratio of PWM signals φ12, φ13 is zero and discharging of battery 3 is stopped.

Figure 9:
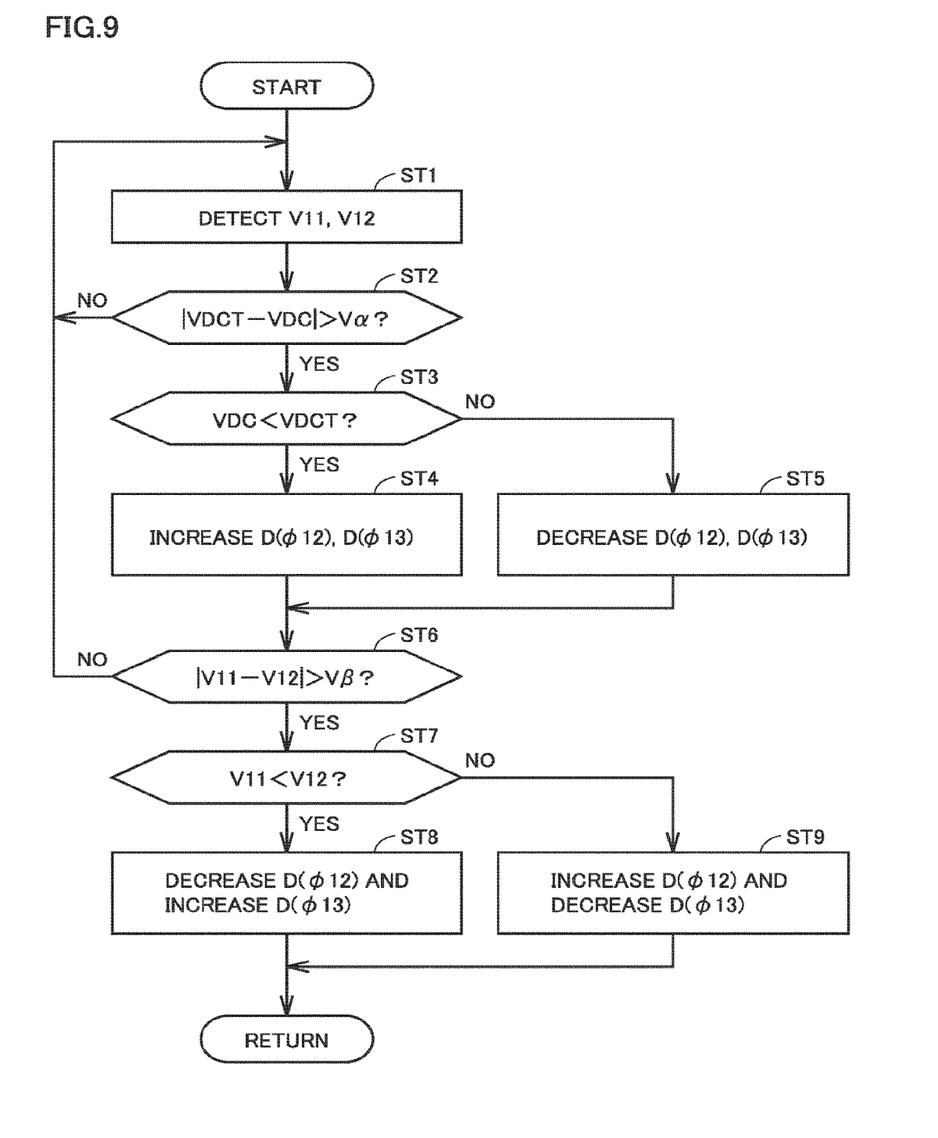
FIG. 9 is a flowchart showing an operation of the controller shown in FIGS. 7 and 8 in a discharging mode.

FIG. 9 is a flowchart showing an operation of controller 63 shown in FIGS. 7 and 8 in a discharging mode. In FIG. 9, controller 63 uses voltage detectors 61, 62 to detect terminal-to-terminal voltages V11, V12 of capacitors C11, C12 in step ST1. In step ST2, controller 63 determines whether or not the absolute value |VDCT−VDC| of the difference between target voltage VDCT and DC voltage VDC=V11+V12 is larger than threshold value Vα. When |VDCT−VDC|>Vα does not hold (i.e., VDC≈VDCT), controller 63 returns to step ST1. When |VDCT−VDC|>Vα holds (i.e., VDC≠VDCT), controller 63 proceeds to step ST3. Vα is set to a value that is sufficiently smaller than VDCT and VDC.

In step ST3, controller 63 determines whether or not VDC<VDCT holds. When VDC<VDCT holds, controller 63 proceeds to step ST4. When VDC<VDCT does not hold, controller 63 proceeds to step ST5. In step ST4, controller 63 increases duty ratio D(φ12) and duty ratio D(φ13) of PWM signals φ12 and φ13. Accordingly, the ON period per cycle of each of transistors Q12 and Q13 is increased and DC voltage VDC is increased to approach target voltage VDCT. In step ST5, controller 63 decreases duty ratio D(φ12) and duty ratio D(φ13) of PWM signals φ12 and φ13. Accordingly, the ON period per cycle of each of transistors Q12 and Q13 is decreased and DC voltage VDC is decreased to approach target voltage VDCT.

Subsequently, in step ST6, controller 63 determines whether or not the absolute value |V11−V12| of the difference between the detected values of voltages V11 and V12 is larger than threshold value Vβ. When |V11−V12|>Vβ does not hold (i.e., V11≈V12), controller 63 returns to step ST1. When |V11−V12|>Vβ holds (i.e., V11≠V12), controller 63 proceeds to step ST7. Vβ is set to a value sufficiently smaller than V11 and V12.

In step ST7, controller 63 determines whether or not V11<V12 holds. When V11<V12 holds, controller 63 proceeds to step ST8. When V11<V12 does not hold, controller 63 proceeds to step ST9. In step ST8, controller 63 decreases duty ratio D(φ12) of PWM signal φ12 and increases duty ratio D(φ13) of PWM signal φ13 and returns to step ST1. Accordingly, the ON period per cycle of transistor Q12 decreases and the ON period per cycle of transistor Q13 increases, so that voltage V11 increases and voltage V12 decreases and the difference between voltages V11 and V12 is reduced.

In step ST9, controller 63 increases duty ratio D(φ12) of PWM signal φ12 and decreases duty ratio D(φ13) of PWM signal φ13 and returns to step ST1. Accordingly, the ON period per cycle of transistor Q12 increases and the ON period per cycle of transistor Q13 decreases, so that voltage V11 decreases and voltage V12 increases and the difference between voltages V11 and V12 is reduced. Steps ST1 to ST5 can be repeated to allow VDC VDCT and V11 V12 to hold.

In steps ST4, ST5, duty ratios D(φ12), D(φ13) of PWM signals φ12, φ13 may be increased or decreased by a certain value, or the value by which duty ratios D(φ12), D(φ13) of PWM signals φ12, φ13 is increased or decreased may be changed depending on the difference between VDCT and VDC.

Likewise, in steps ST8, ST9, duty ratios D(φ12), D(φ13) of PWM signals φ12, φ13 may be increased or decreased by a certain value, or the value by which duty ratios D(φ12), D(φ13) of PWM signals φ12, φ13 is increased or decreased may be changed depending on the difference between V11 and V12.

In the present embodiment, there is no wire LN connecting neutral point NP to terminal T3 of bidirectional chopper 24 in each uninterruptible power supply device 60. Therefore, even when transistor Q12 of bidirectional chopper 24 fails to be short-circuited, no current flows from battery 3 to load 2 and other uninterruptible power supply devices 60 through failing transistor Q12. Thus, even when transistor Q12 of bidirectional chopper 24 fails to be short-circuited, load 2 and other uninterruptible power supply devices 60 will not fail due to the current from battery 3.

Further, when DC power of battery 3 is to be discharged during an outage, the ON period of each of transistors Q12 and Q13 is controlled so that terminal-to-terminal voltage V11 of capacitor C11 is equal to terminal-to-terminal voltage V12 of capacitor C12. Thus, capacitors C11 and C12 can be equally charged, and capacitor C11 or C12 can be prevented from being broken due to excessive terminal-to-terminal voltage V11 or V12 of capacitor C11 or capacitor C12.

In the present embodiment, when V11 V12 holds, the ON period of one of transistors Q12 and Q13 of bidirectional chopper 24 is increased and the ON period of the other transistor is decreased so as to cause V11=V12 to hold. This is not a limitation. Specifically, the ON period of one of transistors Q12 and Q13 may be increased or decreased and the ON period of the other transistor may be kept as it is so as to cause V11=V12 to hold.

It should be construed that the embodiments disclosed herein are given by way of illustration in all respects, not by way of limitation. It is intended that the scope of the present invention is defined by claims, not by the description above, and encompasses all modifications and variations equivalent in meaning and scope to the claims.

REFERENCE SIGNS LIST 1 commercial AC power supply; 2 load; 3 battery; U1-UN uninterruptible power supply device; T1a-T1c input terminal; T0a-T0d output terminal; TBP, TBN battery terminal; S1-S8 switch; 10 input filter; 11-13, 31-33 reactor; 14-15, 34-36, C1, C2, C11, C12 capacitor; CD1-CD6 current detector; 21-23 power converter; 24 bidirectional chopper; 30 output filter; 40 converter; 41 inverter; 42, 53, 63 controller; Q1-Q8, Q11-Q14 transistor; D1-D8, D11-D14 diode; L1 DC positive bus; L2 DC negative bus; L3 DC neutral point bus; F1-F3, F11, F12 fuse; 50 normal mode reactor; 51, 52 coil; T1-T5 terminal; 61, 62 voltage detector; 70, 71, 75 subtractor; 72, 73 control unit; 74 adder; 76, 77 triangular wave generator; 78, 79 comparator

The invention claimed is:

1. A three-phase four-wire uninterruptible power supply device configured to supply an output three-phase AC voltage and a neutral-point voltage to a load, the uninterruptible power supply device comprising:
converter circuitry configured to convert an input three-phase AC voltage supplied from a commercial AC power supply into a first DC voltage, a second DC voltage, and a third DC voltage and output the first, second, and third DC voltages to a first DC bus, a second DC bus, and a third DC bus, respectively;
a first capacitor connected between the first DC bus and the third DC bus;
a second capacitor connected between the third DC bus and the second DC bus;
an inverter configured to convert the first, second, and third DC voltages supplied through the first, second, and third DC buses into the output three-phase AC voltage and supply the output three-phase AC voltage to the load;
a bidirectional chopper connected between the first and second DC buses and a power storage device,
the first DC voltage being higher than the second DC voltage, and the third DC voltage being an intermediate voltage between the first DC voltage and the second DC voltage and supplied as the neutral-point voltage to the load, the bidirectional chopper not being connected to the third DC bus,
the bidirectional chopper including
a third capacitor and a fourth capacitor connected in series between the first DC bus and the second DC bus,
a first transistor and a second transistor connected in series between the first DC bus and a first node between the third capacitor and the fourth capacitor,
a third transistor and a fourth transistor connected in series between the first node and the second DC bus,
a first diode, a second diode, a third diode, and a fourth diode connected in anti-parallel with the first transistor, the second transistor, the third transistor, and the fourth transistor, respectively, and
a normal mode reactor including a first coil connected between a second node and a positive electrode of the power storage device, and a second coil connected between a negative electrode of the power storage device and a third node, the second node being located between the first transistor and the second transistor, the third node being located between the third transistor and the fourth transistor; and
a controller configured to perform
a charging mode during a normal condition in which the commercial AC power supply supplies the input three-phase AC voltage, the controller in the charging mode causing the first transistor and the fourth transistor to be complementarily turned on to charge the power storage device, and
a discharging mode during an outage in which the commercial AC power supply stops supply of the input three-phase AC power, the controller in the discharging mode causing the second transistor and the third transistor to be complementarily turned on to discharge the power storage device,
the controller in the discharging mode controlling an ON period of at least one of the second transistor and the third transistor to cause a terminal-to-terminal voltage of the third capacitor to be equal to a terminal-to-terminal voltage of the fourth capacitor.

2. The uninterruptible power supply device according to claim 1, further comprising:
a first voltage detector configured to detect the terminal-to-terminal voltage of the third capacitor; and
a second voltage detector configured to detect the terminal-to-terminal voltage of the fourth capacitor, wherein
the controller in the discharging mode controls the ON period of at least one of the second transistor and the third transistor to cause a value detected by the first voltage detector to be equal to a value detected by the second voltage detector.

3. The uninterruptible power supply device according to claim 2, wherein
the controller is configured to compare the value detected by the first voltage detector with the value detected by the second voltage detector,
when the value detected by the first voltage detector is smaller than the value detected by the second voltage detector, the controller is configured to decrease the ON period of the second transistor and increase the ON period of the third transistor, and
when the value detected by the first voltage detector is larger than the value detected by the second voltage detector, the controller is configured to increase the ON period of the second transistor and decrease the ON period of the third transistor.

4. An uninterruptible power supply system comprising a plurality of uninterruptible power supply devices each as recited in claim 1,
the plurality of uninterruptible power supply devices being connected in parallel with one another to a load and sharing the power storage device.

* * * * *